May 11, 1965     W. K. KLAGER     3,182,402
MEASURING SYSTEM

Filed July 20, 1962     2 Sheets-Sheet 1

United States Patent Office 3,182,402
Patented May 11, 1965

3,182,402
MEASURING SYSTEM
Wallace K. Klager, Brookfield, Wis., assignor to Cutler-Hammer, Inc., Milwaukee, Wis., a corporation of Delaware
Filed July 20, 1962, Ser. No. 211,319
16 Claims. (Cl. 33—132)

This invention relates to measuring systems and more particularly to systems for measuring the length of moving strip or material.

While not limited thereto, the invention is especially applicable to continuous process lines for measuring and providing a continuous indication of the length of strip within a strip storage pit between entry and exit rolls.

An object of the invention is to provide an improved measuring system.

A more specific object of the invention is to provide improved means for measuring the length of moving material between entry and exit rolls of a continuous process line and for providing a continuous indication thereof.

Another object of the invention is to provide improved means for measuring the length of moving strip in storage between entry and exit rolls of a continuous process line and for providing a control function when the length of strip in storage reaches a maximum or minimum length.

Other objects and advantages of the invention will hereinafter appear.

According to the invention, there are provided measuring means for a continuous process line. The process line may be a continuous pickling line of a steel mill or the like wherein a pair of entry pinch rolls feed a steel strip into a storage pit and a series of exit bridle rolls withdraw steel strip from such storage pit. The aforementioned measuring means are provided for measuring the length of strip fed into the storage pit, measuring the length of strip withdrawn from the storage pit, determining the difference between these lengths and affording a continuous indication at a remote point of the length of strip remaining in the pit. This measuring means comprises a synchro generator driven through a reduction gear by one of the entry pinch rolls. This synchro generator is energized by a single phase alternating voltage of constant peak value. It produces a set of three alternating output voltages which are in phase or in phase opposition with the energizing voltage. The respective phase polarities and peak values of these three output voltages uniquely represent and identify the angular position of the rotor shaft of the synchro generator and thus permit this to be transmitted to a remotely located part of a control system. The output voltage thereof which has peak values and phase polarities proportional to its shaft position is fed to a differential synchro generator. This differential synchro generator is driven through a reduction gear by one of the series of exit bridle rolls. The differential synchro generator is energized by the three alternating output voltages produced by the synchro generator described above. It produces three alternating voltages the respective phase polarities and peak values of which identify an angular position which is the algebraic difference of the generator and differential generator rotor shafts. The differential generator thus converts the angular positions of its own shaft and of a remotely located shaft into a resultant set of three electrical voltages. The alternating current output voltage peak values and phase polarities of this differential synchro generator are indicative of the difference between the shaft positions, that is, they indicate the angle by which the shaft of the synchro generator driven by the entry roll leads the shaft of the differential synchro generator driven by an exit roll. This output voltage is then applied to a calibrating means to afford ready adjustment of the indicator indication to zero value when there is no strip in the pit. The calibrating means comprises a synchro control transformer having a knob to afford ready adjustment thereof when calibration is performed. The synchro control transformer is energized by the three alternating output voltages of the differential synchro generator. It produces an alternating voltage the phase polarity and peak value of which identify the angular difference between the positions of its shaft and that of the differential synchro generator. Thus, while a synchro control transformer produces no torque on its output shaft, it converts the differential generator output into a voltage identifying the direction and magnitude of the position difference between the differential generator and control transformer shafts. The voltage from the synchro control transformer is applied through a demodulator which removes the alternating current component and affords a direct current for operating a direct current meter to indicate by a pointer or the like the length of strip in the storage pit. This direct current may also be used after suitable amplification to operate indicators or alarms to indicate that the length of strip stored is approaching either a low or a high value. The high storage alarm is preferably provided with an adjusting means to afford adjustment in the point at which the alarm is actuated because the maximum number of feet that can be stored in the pit varies with the gauge of the strip. It will be apparent that this direct current could also be used as a control signal to control the process. For example, this direct current could be used to slow down or stop appropriate sections of the process line when preset points in the amount of strip in storage are reached.

These and other objects and advantages of the invention and the manner of obtaining them will best be understood by reference to the following detailed description of an embodiment thereof taken in conjunction with the accompanying drawings, wherein.

Figure 1:
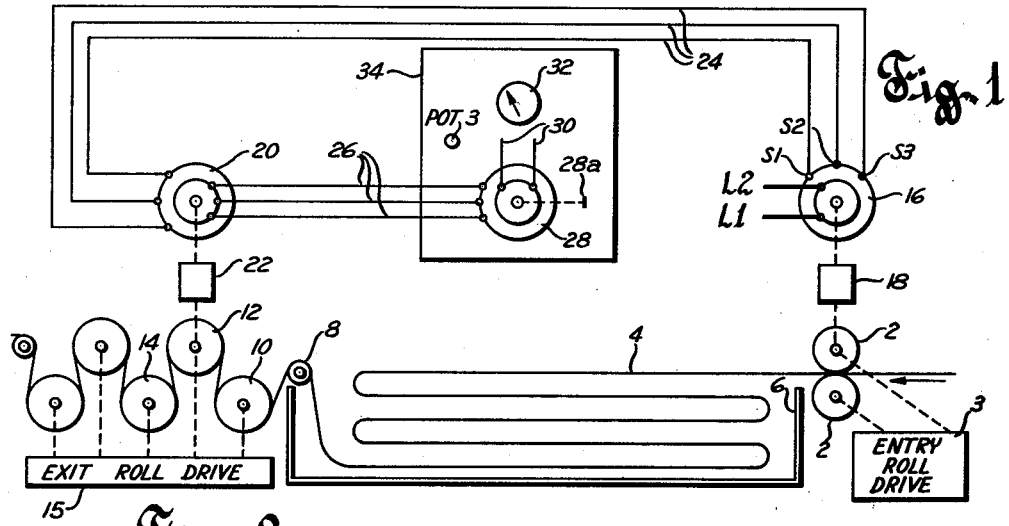
FIGURE 1 is a schematic illustration of a measuring system applied to a continuous process line strip storage system.

Referring to FIG. 1, there is shown a measuring system constructed in accordance with the invention. This measuring system is shown as being applied to a continuous process line having a pair of entry pinch rolls 2 driven by a suitable motor 3. The entry pinch rolls feed a strip 4 of steel or the like into a storage pit 6 from which the strip is withdrawn as desired. As the strip leaves the storage pit, it travels over a small guide roll 8 and then under and over successive exit bridle rolls 10, 12, 14, etc., which are arranged in staggered relation and are driven by a suitable motor or motors 15.

The measuring system comprises means for measuring the length of strip fed into the storage pit. This means comprises a synchro generator 16 driven by a reduction gear 18 which in turn is driven by one of the entry pinch rolls of the pair 2 thereof.

Figure 2:
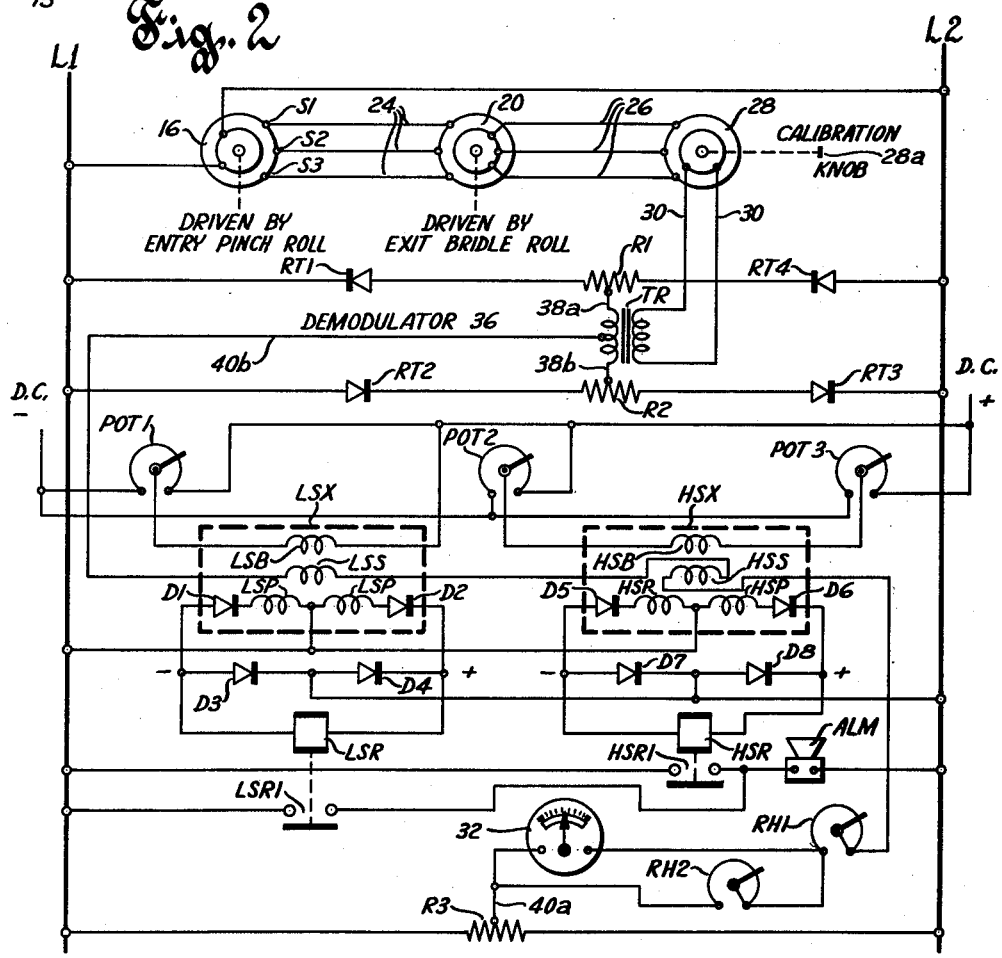
FIG. 2 is a circuit diagram of the measuring system of FIG. 1.
Figure 3:
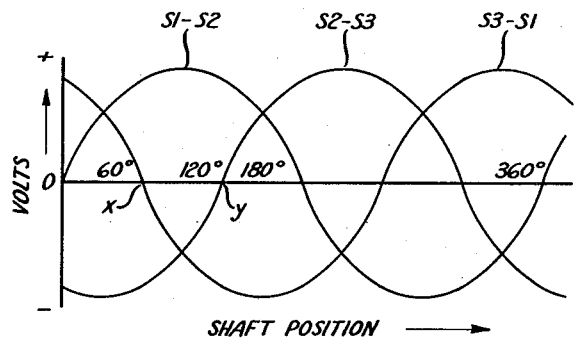
FIG. 3 is a graphical illustration of the output voltages of the synchro generator and differential synchro generator driven by the entry and exit rolls.

Referring to FIGS. 1 and 2, synchro generator 16 is supplied with single phase alternating voltage from power supply lines L1 and L2. When the synchro generator is so energized, it will provide a set of three alternating output voltages at its three output terminals S1, S2 and S3 similar to that shown in FIG. 3. These curves look like a three phase sine wave but they are not three-phase voltages. They constitute a set of three alternating output voltages. The peak value of these alternating voltages is a function of shaft position and not of time. Referring to FIG. 3, it will be apparent that when the shaft of the synchro generator is at zero position, voltage S1–S2 will have zero value and voltages S2–S3 and S3–S1 will have like magnitudes and be displaced in phase 180 degrees from each other. As the shaft is turned from zero to 360 degrees, the voltages shown in FIG. 3 go through one complete rotating cycle so that at any position of the shaft, the peak values and phase polarities of these voltages uniquely define that shaft position. That is, the combination of these voltages is different for each position of the synchro shaft whereby the position of the shaft at any time is defined.

The measuring system also comprises means for measuring the length of strip withdrawn from the storage pit, for subtracting this length from the length of strip fed into the storage pit and for providing an electrical signal indicative of the length of strip remaining in the pit at any time. This means comprises a differential synchro generator 20 driven by a reduction gear 22 which in turn is driven by one of the exit rolls such as roll 12. Referring to FIGS. 1 and 2, output terminals S1, S2 and S3 of synchro generator 16 are connected through conductors 24 to the three input terminals of differential synchro generator 20 to supply the differential synchro generator with a voltage proportional to or indicative of the shaft position of synchro generator 16. The differential synchro generator being driven in accordance with the withdrawal of strip from the pit, provides a set of three alternating output voltages proportional to or indicative of the angular amount by which the shaft of synchro generator 16 is ahead of the shaft of differential synchro generator 20. The three output terminals of differential synchro generator 20 are connected through conductors 26 to the three input terminals of a synchro control transformer 28.

In this connection, it will be observed that synchro generator 16 and differential synchro generator 20 are geared down by reduction gears 18 and 22, respectively. For example, these devices may be geared down so that for 9,000 feet of strip, the rotor turns 135 degrees. In view of this, the rotor of synchro generator 16 cannot be more than 135 degrees ahead of the rotor of differential synchro generator 20 at any time if the storage pit does not hold more than 9,000 feet of strip. Also, the rotor of differential synchro generator 20 can never be ahead of the rotor of synchro generator 16 because the exit rolls cannot withdraw more strip from the storage pit than has been put therein. If the entry and exit rolls have different diameters, reduction gear devices 18 and 22 are provided with a reduction ratio inversely proportional to the diameters of the associated entry and exit rolls 2 and 12 whereby they are driven. As will be apparent, the purpose of this inverse proportionality is to cause the rotor of differential synchro generator 20 to turn the same amount per unit length of strip withdrawn as the rotor of synchro generator 16 turns per unit length of strip fed into the storage pit.

Synchro control transformer 28 is an inductive transformer having a three conductor input and a two conductor output and a manually operable calibrating knob 28a for adjusting the angular positon of its rotor relative to its stator. Synchro control transformer 28 may be similar to synchro generator 16 except that it is used in the reverse direction from the direction in which synchro generator 16 is connected in the system. That is, synchro generator 16 is supplied with single phase alternating current on two input supply lines L1 and L2 and provides an output shown in FIG. 3 on three output conductors 24. On the other hand, synchro control transformer 28 is supplied with three alternating single phase voltages on the three input conductors 26 and provides a single phase output voltage shown in FIG. 4 on its two output conductors 30. As will hereinafter appear, one purpose of synchro control transformer 28 is to facilitate calibration of the indicator system, that is, adjustment of the control transformer so that meter 32 shown in FIGS. 1 and 2 indicates zero footage when all of the strip has been withdrawn from the storage pit. Synchro control transformer 28 is preferably mounted on a control panel or on the door of a control cabinet 34 along with meter 32. Knob 28a may be provided with a 360 degree dial and a pointer having a set screw to keep the knob from turning after it has been adjusted.

Synchro generator 16, differential synchro generator 20 and synchro control transformer 28 are known devices and have been shown schematically to avoid complicating the drawings. For example, devices that may be used therefor are General Electric Company selsyn generator 2J5JA1, selsyn differential generator 2J5SA1 and selsyn control transformer 2J5KA1, respectively.

Referring to FIG. 2, it will be apparent that output conductors 30 of synchro control transformer 28 are connected to the primary winding of an input transformer TR of a demodulator 36. Transformer TR is provided with a center tapped secondary winding having its opposite ends connected to input conductors 38a and 38b of the demodulator.

Demodulator 36 is of the ring type and comprises four diodes RT1, RT2, RT3 and RT4 connected in series in that order to form a ring. These diodes are of the unidirectionally conducting type and are poled so that current will flow in one direction in the ring and will not flow in the other direction. The junction of diodes RT1 and RT2 is connected to supply line L1 and the junction of diodes RT3 and RT4 is connected to supply line L2. The demodulator also comprises voltage dividing resistors R1, R2, and R3, each having a center tap. Resistor R1 is connected at its opposite ends between diodes RT1 and RT4 and its center tap is connected to input conductor 38a. Resistor R2 is connected at its opposite ends between diodes RT2 and RT3 and its center tap is connected to input conductor 38b. Resistor R3 is connected at its opposite ends to supply lines L1 and L2 and its center tap is connected to a first output conductor 40a of demodulator 36. The other output conductor 40b of the demodulator is connected to the center tap of the secondary winding of transformer TR. The demodulator output conductors 40a and 40b are connected to load devices which are energized by the unidirectional output currents of the demodulator.

Figure 5:
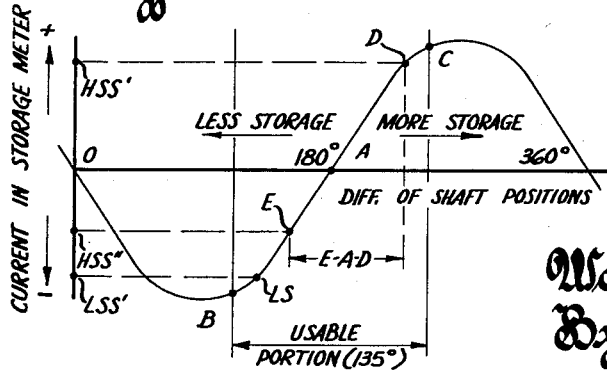
FIG. 5 is a graphical illustration of the output current of the demodulator.

These load devices comprise a strip footage indicator 32 and signal windings of an alarm system, the latter being hereinafter described. Indicator 32 is of the milliammeter type operable on direct current and having a zero current center position from which its pointer is deflectable in opposite directions to indicate respectively opposite polarities of its energizing current. Indicator 32 is, however, provided with a modified scale having a zero at the left end, a "full" legend at the right end and is preferably calibrated in thousands of feet of strip. The thousands numbers on this scale are bunched closer together at the low and high ends than they are in the middle to compensate for the non-linearity of demodulator output current. As shown in FIG. 5, the usable portion of the wave is steeper at the middle at A than it is at either end adjacent B or C. The sine wave of FIG. 5 is characteristic of the output of the selsyn generator and the indicator scale is calibrated accordingly to avoid error in the indication. A rheostat RH1 is connected in series with meter 32 for adjusting the current in the alarm system signal windings and in the meter.

A rheostat RH2 is connected in parallel with the meter for calibrating the latter, that is, for adjusting the current therein.

The alarm system comprises an audible alarm device ALM which may be an electrically operated horn or the like. The operating coil of this alarm is connected for energization across supply lines L1 and L2 through normally open contacts LSR1 and HSR1 in parallel, these being contacts of low storage relay LSR and high storage relay HSR, respectively. The alarm system also comprises a low storage magnetic amplifier LSX and a high storage magnetic amplifier HSX for operating relays LSR and HSR, respectively, when the length of strip in storage reaches preselected low and high values.

Amplifier LSX is provided with a pair of power windings LSP connected in two branches of a rectifier bridge comprising unidirectionally conducting diodes D1, D2, D3 and D4. The input terminals of this bridge are connected to supply lines L1 and L2 and the operating coil of relay LSR is connected to the positive and negative output terminals thereof. Power windings LSP are connected in two branches of the rectifier bridge in series with diodes D1 and D2, respectively, so that rectified current flows therethrough in a direction tending to saturate the magnetizable material of the amplifier. Amplifier LSX is also provided with a bias winding LSB supplied from a direct current source D.C. through a potentiometer POT1. As shown in FIG. 2, the resistor of potentiometer POT1 is connected across source D.C. and bias winding LSB is connected between the positive side of the source and the movable tap of the potentiometer to enable adjustment of the bias current. Amplifier LSX is further provided with a low storage signal winding LSS connected to output conductors 40a and 40b of the demodulator in series with meter 32.

Amplifier HSX is provided with a pair of power windings HSP connected in two branches of a rectifier bridge comprising unidirectionally conducting diodes D5, D6, D7 and D8. The input terminals of this bridge are connected to supply lines L1 and L2 and the operating coil of relay HSR is connected to the positive and negative output terminals thereof. Power windings HSP are connected in two branches of the rectifier bridge in series with diodes D5 and D6, respectively, so that rectified current flows therethrough in a direction tending to saturate the magnetizable material of the amplifier. Amplifier HSX is also provided with a bias winding HSB supplied from direct current source D.C. through a pair of potentiometers POT2 and POT3. As shown in FIG. 2, the resistors of potentiometers POT2 and POT3 are connected in parallel across source D.C. and bias winding HSB is connected between the movable taps of the potentiometers to enable preselection of the range of high storage alarm adjustment on potentiometer POT2 and to enable adjustment on potentiometer POT3 the point of high storage alarm. For this purpose, potentiometer POT3 is mounted on the control cabinet door as shown in FIG. 1 to afford periodic adjustment thereof as desired whereas only an initial adjustment is required on potentiometer POT2. Amplifier HSX is further provided with a high storage signal winding HSS connected to output conductors 40a and 40b of the demodulator in series with meter 32 and low storage signal winding LSS. As shown in FIG. 2, the signal windings of amplifiers LSX and HSX are connected so that current of one polarity turns amplifier LSX "on" and current of the opposite polarity turns amplifier HSX "on."

*Operation*

The operation of the system of FIGS. 1 and 2 will now be described. Application of single phase alternating current power to lines L1 and L2 causes the pointer of meter 32 to deflect and provide an indication. When there is no strip in the storage pit, the knob 28a of synchro control transformer 28 is manually turned in the proper direction so that meter 32 reads zero. The manner in which this zero reading is obtained will be described hereinafter in more detail in connection with FIG. 5 which illustrates the output current curve of the demodulator.

Referring to FIG. 2, application of power to supply lines L1 and L2 causes a single phase alternating current voltage to be applied to the two input terminals of synchro generator 16. This provides three alternating voltages at output terminals S1, S2 and S3 of synchro generator 16 similar to that shown in FIG. 3. If the rotor of synchro generator 16 is at its zero position, the voltage across output terminals S1–S2 has zero value and the voltage across output terminals S2–S3 is changing in one direction, for example, positive, at the time that the voltage across output terminals S3–S1 is changing in the opposite direction, for example negative. FIG. 3 also shows the relationship of the three output voltages of synchro generator 16 for any other angular position of its rotor from zero to 360 degrees. It will be apparent from FIG. 3, that the three output voltages of synchro generator 16 have a different and distinctive relationship for each angular position of its rotor in each complete 360 degree turn of the latter and that this relationship repeats for each 360 degree turn. Consequently, this relationship of the three output voltages is indicative of the angular position of the rotor of synchro generator 16.

The output voltage shown in FIG. 3 of synchro generator 16 is applied through conductors 24 to the three input terminals of differential synchro generator 20. This causes three alternating single phase voltages also like that shown in FIG. 3 to appear at the three output terminals of the differential synchro generator which are applied through conductors 26 to the three input terminals of synchro control transformer 28. In a similar manner, the relationship of the three voltages shown in FIG. 3 at any point along the horizontal axis is indicative of the angular position of the rotor of differential synchro generator 20. For example, if there is no angular displacement between the rotors of generator 16 and differential generator 20, the output of the latter will be identical to its input, that is, the output of generator 16. If both generators have their rotors at zero position, the relationship of the three output voltages is as hereinbefore described shown at the left-hand end zero point of FIG. 3. If both rotors are turned 60 degrees, the relationship of the three output voltages is as shown at point X in FIG. 3. If both rotors are turned 120 degrees the relationship of the three output voltages is shown at point Y in FIG. 3, etc.

Figure 4:
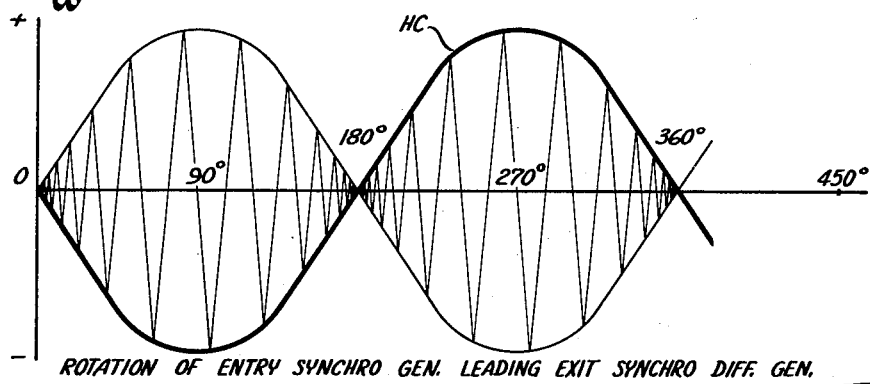
FIG. 4 is a graphical illustration of the output voltage of the synchro control transformer.

Application of the output voltages of differential synchro generator 20 to the three input terminals of synchro control transformer 28 causes a single phase output voltage to appear at the two output conductors 30 thereof similar to that shown in FIG. 4. This output voltage oscillates at the frequency of the supply voltage and its peak value and phase polarity are dependent on the relative rotor positions of synchro generator 16 and differential synchro generator 28. The heavy curve HC in FIG. 4 shows the relation of the voltage appearing across the primary winding of transformer TR in peak value and phase polarity with respect to the alternating current line voltage for changes in rotor position of generator 16 and differential generator 28. Thus, the peak value and phase polarity of the voltage depicted by curve HC is indicative of the angular amount by which the rotor of synchro generator 16 is ahead of the rotor of differential synchro generator 28.

The voltage shown in FIG. 4 is put through demodulator 36 which takes out the alternating current component and affords a direct current which can be used to operate a direct current meter. This direct current output of the demodulator is depicted in FIG. 5.

Operation of the ring demodulator

An alternating current reference voltage is applied from lines L1 and L2 to the ring demodulator. An alternating current signal voltage is applied through transformer TR to the ring demodulator. For purposes of description of operation of the ring demodulator, let it be assumed that the reference and signal voltages have a first phase relationship such that when line L1 is positive, the upper end of the secondary winding of transformer TR is positive as represented by the lower or negative half of the curve in FIG. 5.

The function of the reference voltage is to pass current through diodes RT2 and RT3 during the half cycle when its polarity is as hereinbefore assumed and to pass current through diodes RT1 and RT4 during each alternate half cycle when its polarity is reversed. When diodes RT2 and RT3 are conducting, diodes RT1 and RT4 have a reverse voltage across them and diodes RT2 and RT3 are reverse biased when diodes RT1 and RT4 are conducting. In this way, the reference voltage causes the conducting diodes to have low impedance and the reverse biased diodes to have high impedance and vice versa, alternately. The signal voltage does not reach a magnitude larger than the reference voltage so that the reverse bias will not be removed when it is required to be there.

During the half cycle that line L1 is positive, the reference voltage causes current flow from line L1 through diode RT2, resistor R2 and diode RT3 to line L2. The reference voltage also causes current flow from line L1 through resistor R3 to line L2.

Although a signal voltage is applied to the primary winding of transformer TR, current cannot flow from the upper end of the secondary winding thereof through conductor 38a because diodes RT1 and RT4 present high impedances as aforestated. However, as a result of the signal voltage, current can flow from the center tap of the secondary winding of transformer TR through conductor 40b, low storage signal winding LSS and high storage signal winding HSS, rheostat RH1, milliammeter 32, conductor 40a, and then through the left-hand portion of resistor R3, diode RT2, the left-hand portion of resistor R2 and conductor 38b to the lower end of the secondary winding of transformer TR.

On the succeeding half cycle, when the polarities of the reference and signal voltages each reverse, diodes RT4 and RT1 are rendered conducting and diodes RT3 and RT2 are reverse biased to prevent current conduction therethrough. Under this condition current cannot flow from the lower end of the secondary winding of transformer TR through conductor 38b because diodes RT2 and RT3 present high impedances. However, current can flow from the center tap of the secondary winding of transformer TR through conductor 40b, windings LSS and HSS, rheostat RH1, meter 32, conductor 40a, and then through the right-hand end of resistor R3, diode RT4 and the right-hand portion of resistor R1 and conductor 38a to the upper end of the secondary winding of transformer TR.

Let it now be assumed for purposes of description of the ring demodulator that the reference and signal voltages applied thereto have a second phase relationship with one another. Under these conditions, the unidirectional current flow in the load devices will be in the opposite direction. During each half cycle of the reference voltage when line L1 is positive, the lower end of the secondary winding of transformer TR is positive according to said second phase relationship. Current will flow through diode RT2, resistor R2 and diode RT3 whereas diodes RT1 and RT4 will be reverse biased. The signal voltage causes current flow from the lower end of the secondary winding of transformer TR through conductor 38b, the right-hand portion of resistor R2, diode RT3, the right-hand portion of regitser R3, conductor 40a, meter 32, rheostat RH1, windings HSS and LSS and conductor 40b to the center tap of the transformer secondary winding.

On each succeeding half cycle, when the polarities of the reference and signal voltages each reverse, diodes RT4 and RT1 are rendered conducting and diodes RT3 and RT2 are reverse biased to prevent current conduction therethrough. Current now flows from the upper end of the transformer secondary winding through conductor 38a, the left-hand portion of resistor R1, diode RT1, the left-hand portion of register R3, conductor 40a, meter 32, rheostat RH1, windings HSS and LSS and conductor 40b to the center tap of the transformer secondary winding.

From the foregoing, it will be apparent that when the reference and signal voltages have said first phase relationship, direct current will flow in windings LSS and HSS and meter 32 in one direction from conductor 40b to conductor 40a. When the reference and signal voltages have said second phase relationship, direct current will flow in these load devices in the opposite direction from conductor 40a to conductor 40b. In other words, a phase shift of the signal voltage from in phase with the reference voltage to 180 degrees out of phase with the reference voltage will cause a reversal of polarity and change in magnitude of the direct current in the load devices from maximum value in one direction through zero to maximum value in the other direction. This is illustrated in FIG. 5 which depicts the output current of the demodulator which is applied to meter 32. It will be apparent that the curve in FIG. 5 is similar to the heavy line curve HC in FIG. 4, the alternating current component having been removed by the demodulator. As shown in FIG. 5, the direct current in the load devices increases from maximum negative to maximum positive when the phase of the signal voltage is shifted 180 degrees relative to the phase of the reference voltage.

Since it is desirable to have a reasonably linear scale on milliammeter 32, the most linear 135 degree portion of the sine wave curve in FIG. 5 has been selected as the usable portion. This portion extends from point B through point A to point C in FIG. 5. As the horizontal coordinate in FIG. 5 depicts difference in the angular positions of the rotors of synchro generator 16 and differential synchro generator 20, means must be provided for presetting the system for operation in the most nearly linear current range of 135 degrees. This means comprises synchro control transformer 28. This presetting is also required to enable use of a zero center milliammeter which has been provided with a modified scale having a zero at the left end. By turning the knob 28a of the synchro control transformer when there is no strip in the pit, the output current of the demodulator is adjusted to point B on the curve in FIG. 5. In this connection, rheostat RH1 has been provided in series with meter 32 to afford an initial adjustment to obtain the correct zero storage reading on the meter. Under this condition current flows in the reverse direction through the meter. This current flows from the center tap of the secondary winding of transformer TR through conductor 40b, windings LSS and HSS, rheostat RH1, meter 32 and conductor 40a as hereinbefore described.

When entry pinch rolls 2 in FIG. 1 feed strip into the storage pit, the rotor of synchro generator 16 is advanced ahead of the rotor of differential synchro generator 20. As a result, the output voltage of synchro generator 16 changes from its zero relationship shown in FIG. 3 toward the right in accordance with the shaft (or rotor) position of the synchro generator. Assuming that strip is fed into the storage pit in an amount causing rotation of the synchro generator 120 degrees, the output voltage of the latter is depicted by point Y in FIG. 3. Under this condition, the difference in the rotary positions of synchros 16 and 20 is 120 degrees. If the exit rolls withdraw strip from the storage pit in an amount causing rotation of the differential synchro generator 60 degrees, the latter in effect subtracts 60 degrees from point Y in FIG. 3 whereby the resultant output voltage of differential synchro generator 20 is depicted by point X in FIG. 3. That is, there is now 60 degrees difference in the positions of synchros 16 and 20.

As the angular difference between the synchros 16 and 20 increases from zero as strip is accumulated in the storage pit, the output current of the demodulator decreases from its negative value at point B in FIG. 5 toward zero value at point A. This causes the pointer of meter 32 to move from zero on its modified scale toward its center position to indicate that the pit is approaching half full. When the pit is half full, the meter pointer is at its center position because the output current of the demodulator has decreased to zero value at point A in FIG. 5. As more strip is accumulated in the pit, the output current of the demodulator reverses polarity and increases from point A toward point C in FIG. 5. This causes the pointer of meter 32 to deflect to the right of its center position to indicate the larger number of feet of strip in the pit.

Low storage amplifier LSX operates relay LSR to energize alarm ALM when the amount of strip in the pit reaches a predetermined low storage length. High storage amplifier HSX operates relay HSR to energize alarm ALM when the amount of strip in the pit reaches a predetermined adjustable high storage length. Referring to FIG. 2, it will be apparent that the power windings of amplifier LSX are energized by current flow from line L1 through the right power winding LSP, diode D2, operating coil of relay LSR and diode D3 to line L2. On each alternate half cycle of the supply voltage, current flows from line L2 through diode D4, operating coil of relay LSR, diode D1 and the left power winding LSP to line L1. In this manner, rectified current flows from the positive and negative output terminals of amplifier LSX to the operating coil of relay LSR. The power windings of amplifier HSX are energized by current flow from line L1 through the right power winding HSP, diode D6, operating coil of relay HSR and diode D7 to line L2. On each alternate half cycle of the supply voltage, current flows from line L2 through diode D8, operating coil of relay HSR, diode D5 and the left power winding HSP to line L1.

Current flows from direct current source D.C. to energize bias windings LSB and HSB of the low storage and high storage amplifiers. To this end, current flows from the positive side of source D.C. through the resistor of potentiometer POT1 to the negative side of the source. An adjustable portion of the voltage drop across the right-hand portion of the resistor of potentiometer POT1 is applied from the movable tap of the latter to cause current flow through bias winding LSB. Currents flows from the positive side of source D.C. through the resistors of potentiometers POT2 and POT3 in parallel to the negative side of the source. An adjustable portion of the voltage drops appearing across the resistors of potentiometers POT2 and POT3 is applied from the movable taps thereof to cause current flow of the desired magnitude and polarity through bias winding HSB.

Figure 6:
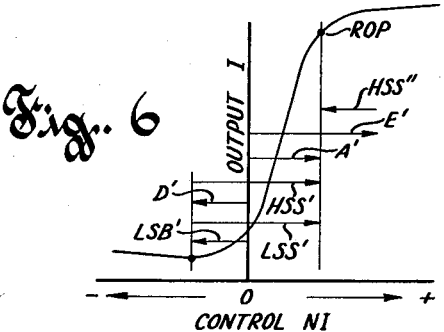
FIG. 6 is an output current curve of the magnetic amplifiers of FIG. 2.

FIG. 6 shows an operating characteristic curve for magnetic amplifiers such as amplifiers LSX and HSX. The amplifier circuits have been arranged in FIG. 2 so that current flow through the windings thereof in the right-hand direction tends to turn the amplifier "on" and current flow therethrough in the left-hand direction tends to turn the amplifier "off." As hereinbefore described, in the absence of any bias current or signal current, current will flow in power windings LSP and HSP of the amplifiers in the right-hand direction a small amount as shown by the vertical zero line in FIG. 6. Current flow through bias winding LSB of the low storage amplifier is in the left-hand direction to bias the amplifier toward or to minimum output as shown by arrow LSB' in FIG. 6. Current flow in signal winding LSS of the low storage amplifier in the right-hand direction when the storage pit is less than half full will turn the amplifier "on."

When the amount of strip in the pit decreases to its low storage alarm point, for example, 600 feet depicted by point LS in FIG. 5, the negative current in signal winding LSS reaches a value LSS' shown in FIG. 5 and depicted by arrow LSS' in FIG. 6 whereby the output current of the amplifier reaches relay operating point ROP. As a result, relay LSR operates and closes its contact LSR1 to energize alarm ALM whereby to indicate that the length of strip in storage has decreased to a low value. Current flow in signal winding LSS of the low storage amplifier in the opposite direction when the pit is more than half full serves no useful purpose. It merely drives amplifier LSX beyond its point of minimum output.

The bias winding circuit of high storage amplifier HSX has been provided with two potentiometers POT2 and POT3 to afford adjustment of the high storage relay operating point anywhere within the range E-A-D in FIG. 5. Referring to FIG. 2, it will be apparent that the resistors of potentiometers POT2 and POT3 are connected in parallel across direct current source D.C. This reversing bridge connection enables the potentiometers to be adjusted to cause current flow in either direction through bias winding HSB. If the movable tap of potentiometer POT2 is turned counterclockwise, current will flow through winding HSB in the left-hand direction to bias the high storage amplifier toward minimum output. If the movable tap of potentiometer POT2 is turned clockwise, current will flow through winding HSB in the right-hand direction to turn the amplifier "on."

If it is desired to set the operation of high storage relay HSR at point D in FIG. 5, potentiometer POT2 is adjusted to cause current flow in the left-hand direction through bias winding HSB to bias the amplifier toward or to minimum output as shown by arrow D' in FIG. 6. Under this condition, relay HSR will operate the alarm when the storage pit is almost full. Operation of relay HSR requires a current flowing in the right-hand direction in winding HSS or positive current of value HSS' shown in FIG. 5 to turn the high storage amplifier to relay operating point ROP as shown by arrow HSS' in FIG. 6.

If it is desired to set the operation of relay HSR at point A in FIG. 5, potentiometer POT2 is adjusted to cause current flow in the right-hand direction through bias winding HSB to turn the high storage amplifier to relay operating point ROP as shown by arrow A' in FIG. 6. Under this condition relay HSR will operate the alarm when zero current flows in signal winding HSS, that is, when the negative current (current flow through winding HSS in the left-hand direction) in winding HSS decreases to zero value indicating that the storage pit has reached half full. If any negative current flows in winding HSS, the high storage amplifier will operate below relay operating point ROP.

If it is desired to set the operation of relay HSR at point E in FIG. 5, potentiometer POT2 is adjusted to cause current flow in the right-hand direction through bias winding HSB to turn the high storage amplifier beyond relay operating point ROP as shown by arrow E' in FIG. 6. Under this condition, relay HSR will operate the alarm when the negative current, that is, current flow in the left-hand direction, in winding HSS decreases to value HSS'' shown in FIG. 5. As will be apparent from FIG. 6, when the negative current in winding HSS is greater than value HSS'', this current will oppose the effect of the positive bias current E' (right-hand direction) in bias winding HSB to cause the amplifier to operate below relay operating point ROP. However, when the current in winding HSS decreases to value HSS'' indicating an increase in the amount of strip in storage, amplifier HSX output reaches point ROP and relay HSR operates to close its contact HSR1 and operate the alarm.

In the foregoing, the setting of the operating point of relay HSR has been described as being made by adjusting potentiometer POT2. Since potentiometer POT3 is connected in parallel with potentiometer POT2 across direct current source D.C., it will be apparent that like energizations of winding HSB can be obtained by adjusting potentiometer POT3, with the difference that potentiometer POT3 is adjusted in the opposite direction from the direction of each of the aforedescribed adjustments of potentometer POT2 to obtain the same effect. However, potentiometer POT2 is preferably adjusted only initially to set the range of operation of high storage relay HSR. For example, potentiometer POT2 is adjusted to set the operation of relay HSR within the range EAD in FIG. 5. The other potentiometer POT3 may then be used to adjust the operating point of relay HSR at a desired point within this range. For this purpose, potentiometer POT3 is mounted on control cabinet door 34 as shown in FIG. 1 to afford ready access thereto so that the operating point of the high storage alarm relay may be adjusted or readjusted at any time to any desired strip footage within the preselected range set on potentiometer POT2. As the number of feet of strip required to fill the storage pit varies with variation in the gauge or thickness of the strip, it is necessary to change the footage at which relay HSR operates with change in the gauge of the strip. Mounting potentiometer POT3 on the control cabinet door facilitates making this adjustment. For example, when thicker strip is used whereby the pit will accommodate a shorter length, it becomes necessary to lower the point at which the high storage alarm will sound. This is done by turning potentiometer POT3 counterclockwise to decrease the bias of the high storage amplifier whereby a smaller positive current on winding HSS will operate the amplifier to relay operating point ROP. Although relays LSR and HSR have been shown in FIG. 2 as connected to operate an audible alarm, it will be apparent that a visual alarm device could be connected in place of the audible alarm or that one relay could operate a visual alarm and that the other relay could operate an audible alarm. The minimum length of strip stored, that is, the distance between entry rolls 2 and exit roll 12 may be disregarded because this amount of strip must remain in the process line and cannot be withdrawn except when the process is discontinued.

The invention hereinbefore described is advantageous because it is efficient in operation and can be economically installed and operated. It has clear advantages over mechanical counters or the like. To install a mechanical counter to measure length of strip would be a very cumbersome thing to do mechanically. It would be necessary to have an element of such counter ride or frictionally engage the strip to be driven thereby or it would have to ride the roll or be driven by both the input and output rolls. It would have to add when driven by the input rolls and subtract when driven by the output rolls. The invention is an improvement over such prior known devices. Further advantages of the invention reside in its structure whereby reversing of either the entry rolls or the exit rolls will not cause the system to go out of calibration. The system will back up the footage count if the entry rolls are reversed and add to the footage count if the exit rolls are reversed. Although the system does not measure strip length directly but instead measures the circumference of the roll which drives the strip and the synchro, the invention has further advantages in that any error between the length of strip and the circumference of the roll caused by slippage or the like can be readily corrected. Although the system will integrate or add and accumulate such errors, the system can be readily recalibrated to remove such error. To do this, it is only necessary to run all of the strip out of the pit, loosen the set screw on the adjusting knob of the synchro control transformer, and turn such control transformer until the meter reads zero. However, there is also the possibility that any error caused by the entry rolls will tend to be canceled out by error on the exit rolls so that the system does not require frequent recalibration.

While the system hereinbefore described is effectively adapted to fulfill the objects stated, it is to be understood that I do not intend to confine my invention to the particular preferred embodiment of measuring system disclosed, inasmuch as it is susceptible of various modifications without departing from the scope of the appended claims.

I claim:

1. In a strip processing apparatus having strip moving means including independently operable strip feeding means and strip withdrawing means, strip measuring apparatus for providing a continuous indication of the length of strip between said feeding means and said withdrawing means comprising:
   (a) means responsive to said feeding means for providing an electrical signal which is a function of the length of strip fed by said feeding means;
   (b) means responsive to said electrical signal and to said withdrawing means for providing a second electrical signal which is a function of the difference between the length of strip fed and the length of strip withdrawn by said withdrawing means;
   (c) a meter for indicating the length of strip accumulated between said feeding and withdrawing means;
   (d) and signal translating means for translating said second electrical signal and applying it to operate said meter and comprising manually adjustable means for adjusting said second electrical signal for zero indication at said meter when no strip is accumulated between said feeding and withdrawing means.

2. In a strip processing apparatus having strip moving means including independently operable strip feeding means and strip withdrawing means, strip measuring apparatus for providing a continuous indication of the length of strip between said feeding means and said withdrawing means comprising:
   (a) means responsive to said feeding means for providing an alternating electrical signal which is a function of the length of strip fed by said feeding means;
   (b) means responsive to said alternating signal and to said withdrawing means for providing a second alternating electrical signal which is a function of the difference between the length of strip fed and the length of strip withdrawn by said withdrawing means;
   (c) a demodulator responsive to said second alternating electrical signal for providing a unidirectional electrical signal having a polarity and magnitude according to the amount by which the length of accumulated strip is above or below a predetermined value;
   (d) a meter responsive to said unidirectional signal for indicating the length of strip accumulated between said feeding and withdrawing means;
   (e) and means for adjusting said second alternating electrical signal going into said demodulator so that said meter indicates zero when no strip is accumulated.

3. The invention defined in claim 2, together with:
   (a) alarm means;
   (b) and means responsive to said unidirectional signal when the length of accumulated strip changes to a preselected value for operating said alarm means.

4. The invention defined in claim 3, together with:
   (a) adjustable means operable to preselect the operating point of said alarm means in terms of length of strip accumulated.

5. The invention defined in claim 3, wherein said means for operating said alarm means comprises:
   (a) a pair of magnetic amplifiers, each having power windings and control windings and bias windings, and means connected to said power windings for operating said alarm means;
   (b) means connecting the control windings of the two amplifiers reversely to said demodulator so that one of the amplifiers operates when said unidirectional electrical signal has a preselected magnitude of one polarity and the other amplifier operates when said unidirectional electrical signal has a preselected magnitude of the other polarity;

(c) a direct current source;

(d) and means comprising a potentiometer connecting said direct current source to the bias windings of each amplifier affording manual adjustment of the operating point of the associated alarm operating means in accordance with the length of strip in the pit.

6. In a strip processing apparatus having strip moving means including independently operable strip feeding entry rolls and strip withdrawing exit rolls, strip measuring apparatus for providing a continuous indication of the length of strip accumulated in a storage pit between said entry rolls and said exit rolls comprising:

(a) means comprising a first reduction gear device driven by an entry roll and a first synchro driven by said reduction gear device to cause rotation thereof to an angle proportional to the length of strip fed into said pit, said angle for a length of strip sufficient to fill the pit being equal to the substantially straight line portion of a sine wave half cycle;

(b) an alternating voltage source for energizing said first synchro to provide an alternating output signal which is a function of the length of strip fed into said pit;

(c) means comprising a second reduction gear device driven by an exit roll and a differential synchro driven by said second reduction gear device to cause rotation thereof to an angle proportional to the length of strip withdrawn from the pit, said angle for a length of strip sufficient to empty a full pit being equal to said substantially straight line portion of a sine wave half cycle;

(d) means for applying said alternating output signal from said first synchro as an input signal to said differential synchro whereby the latter provides an alternating output signal which has a magnitude and phase indicative of the angle by which said first synchro leads said differential synchro;

(e) means for modifying the alternating output signal obtained from said differential synchro and for adjusting the phase thereof;

(f) means for converting the last mentioned alternating output signal into a unidirectional signal having an amplitude variation from a maximum value of one polarity when the pit is empty to a maximum value of the other polarity when the pit is full;

(g) and means responsive to said unidirectional signal for indicating the length of strip accumulated in the pit.

7. The invention defined in claim 6, wherein said means for adjusting the phase of said alternating output signal obtained from said differential synchro comprises:

(a) a manually rotatably adjustable synchro control transformer operable to shift the phase of its output signal whereby said unidirectional signal obtained from said converting means may be adjusted so that it has zero value when the pit is half full of strip.

8. The invention defined in claim 6, wherein said means for converting comprises:

(a) a ring demodulator supplied from said alternating voltage source and being responsive to said modified alternating signal for providing said unidirectional signal.

9. The invention defined in claim 6, wherein said indicating means comprises a direct current meter.

10. In a continuous process system having a storage pit, entry roll means for feeding material strip into the storage pit, exit roll means for withdrawing material strip from the storage pit, and individual drive means for said entry and said exit roll means for driving the same at desired speeds, the improvement comprising:

(a) means comprising a first synchro and a first reduction gear device driven by said entry roll means to cause rotation of said first synchro to an angle proportional to the length of material strip fed into said storage pit;

(b) a single phase alternating current source connected to two input terminals of said first synchro for energizing said first synchro to provide an output signal having a characteristic proportional to the length of material strip that has been fed into the storage pit, said first synchro being provided with three output terminals whereby the output thereof consists of three alternating output voltages having a different and distinctive relationship for each different angular position of said first synchro;

(c) means comprising a second synchro and a second reduction gear device driven by said exit roll means to cause rotation of said second synchro to an angle proportional to the length of material strip withdrawn from said storage pit, said second synchro comprising three input terminals to which the output voltages of said first synchro are applied;

(d) means for applying said output signal from said first synchro as an input signal to said second synchro whereby said second synchro provides an output signal having a characteristic proportional to the angle by which said first synchro leads said second synchro, said second synchro comprising three output terminals whereby the output thereof consists of three alternating output voltages having a different and distinctive relationship for each different angular amount by which said first synchro leads said second synchro, said characteristic of said output signal of said second synchro being thereby proportional to the length of strip in storage at any time;

(e) utilization means;

(f) and means for modifying said output signal of second synchro whereby to render said characteristic thereof effective to operate said utilization means comprising:

(g) a synchro control transformer having three input terminals to which the output voltages of said second synchro are applied and two output terminals for providing an alternating output voltage;

(h) and a demodulator controlled by said single phase alternating current source and being responsive to said alternating output voltage of said synchro control transformer to provide a unidirectional output current having a sine wave characteristic magnitude and polarity which are functions of the phase relation of said alternating current source and the output voltage of said synchro control transformer and of the peak value of the latter.

11. The invention defined in claim 10, wherein said synchro control transformer further comprises:

(a) means for adjusting the rotor thereof to set the demodulator for operation on the most linear portion of the sine wave characteristic of its unidirectional output current.

12. The invention defined in claim 11, wherein the rotor of said synchro control transformer is adjusted so that the output current of said demodulator has zero value when the storage pit is half full, a negative polarity when said storage pit is less than half full and a positive polarity when said storage pit is more than half full.

13. The invention defined in claim 12, wherein said utilization means comprises:

(a) a direct current meter of the type having a zero current center position;

(b) and said meter being provided with a modified scale calibrated in unit length of material strip and indicating zero length at one end of the scale when the storage pit is empty, indicating half full at the center point of the scale and indicating a maximum storage length at the other end of its scale.

14. The invention defined in claim 13, wherein said utilization means comprises:
   (a) an alarm device;
   (b) and means responsive to a predetermined magnitude of negative polarity of said unidirectional output current of said demodulator indicative of a small amount of strip in storage for energizing said alarm device.

15. The invention defined in claim 13, wherein said utilization means comprises:
   (a) an alarm device;
   (b) and means responsive to a preselected magnitude of positive polarity of said unidirectional output current of said demodulator when the strip in storage is approaching its maximum storage length for energizing said alarm device.

16. The invention defined in claim 15, wherein said alarm device energizing means comprises:
   (a) means for adjusting the same to energize said alarm device at a desired magnitude of demodulator output current within a preselected range thereof whereby to cause said alarm device to operate at the proper degree of storage when material strip of a different thickness is used.

References Cited by the Examiner
UNITED STATES PATENTS
2,306,750  12/42  Rendel _____ 80—35.1
2,869,241  1/59   Wilt _____ 80—35.1

ISAAC LISANN, *Primary Examiner.*